United States Patent [19]

Jochem et al.

[11] Patent Number: 4,490,163
[45] Date of Patent: Dec. 25, 1984

[54] METHOD OF MANUFACTURING A FIBER-OPTICAL COUPLING ELEMENT

[75] Inventors: Cornelis M. G. Jochem; Giok D. Khoe; Antonius J. A. Nicia, all of Eindhoven, Netherlands

[73] Assignee: U.S. Philips Corporation, New York, N.Y.

[21] Appl. No.: 470,889

[22] Filed: Feb. 28, 1983

[30] Foreign Application Priority Data

Mar. 22, 1982 [NL] Netherlands ............. 8201167

[51] Int. Cl.³ .............. C03B 37/14; G02B 7/26
[52] U.S. Cl. ....................... 65/4.21; 65/4.2; 350/96.15
[58] Field of Search ............. 65/4.2, 4.21; 350/96.15

[56] References Cited

U.S. PATENT DOCUMENTS

| | | | |
|---|---|---|---|
| 3,860,405 | 1/1975 | Coucoulas et al. | 65/4.21 |
| 3,902,786 | 9/1975 | Brown | 350/96.16 |
| 3,990,875 | 11/1976 | Hopkins | 65/4.21 |
| 4,011,007 | 3/1977 | Phaneuf et al. | 65/4.2 X |
| 4,021,097 | 5/1977 | McMahon | 350/96 |
| 4,054,366 | 10/1977 | Barnoski et al. | 350/96.15 |
| 4,243,399 | 1/1981 | Khoe et al. | 65/4.21 |
| 4,410,346 | 10/1983 | Aulich et al. | 65/4.2 |

FOREIGN PATENT DOCUMENTS 2030318  4/1980  United Kingdom ............. 350/96.15

Primary Examiner—S. Leon Bashore
Assistant Examiner—Michael K. Boyer
Attorney, Agent, or Firm—Marc D. Schechter

[57] ABSTRACT

A method of manufacturing a fiber-optical coupling element by fusion of two monomode fibers. The fiber cores are made of a core glass, the American softening temperature of which is at least 80° C. higher than that of the cladding glass. The fibers are heated to a temperature between 520° and 560° C. By the method, fibers can be fused to form a coupling element without undesirable deformation of the fiber cores.

2 Claims, 6 Drawing Figures

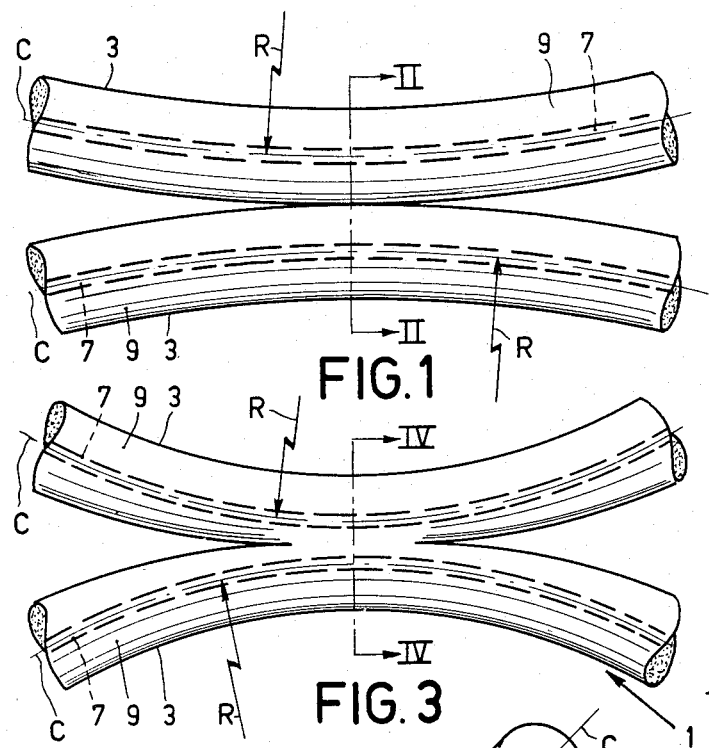
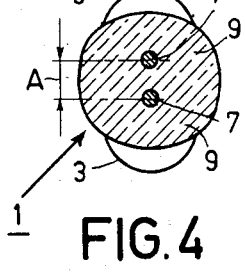
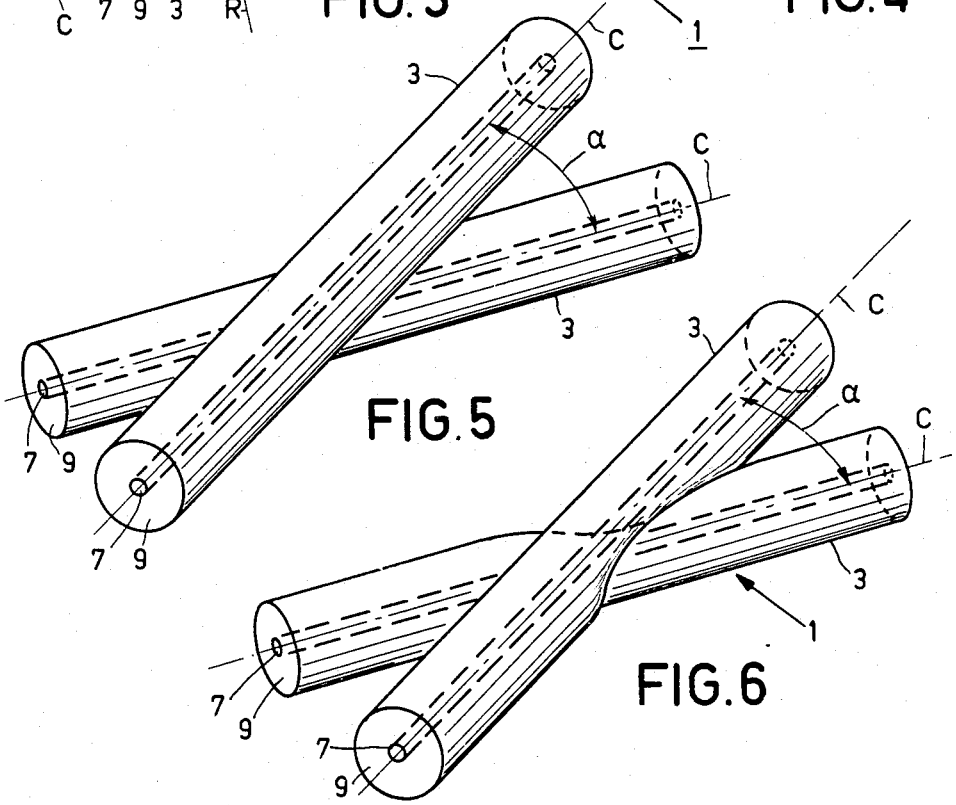
FIG.1 FIG.2 FIG.3 FIG.4 FIG.5 FIG.6

METHOD OF MANUFACTURING A FIBER-OPTICAL COUPLING ELEMENT

BACKGROUND OF THE INVENTION

The invention relates to a method of manufacturing a fiber-optical coupling element. The coupling element comprises at least two monomode fibers fused together over a given length. Each fiber comprises a fiber core of core glass and a fiber cladding of cladding glass. In the fibers, the cladding glass has a refractive index and a softening temperature, both of which are lower than the refractive index and the softening temperature of the core glass.

The two fibers are positioned so that their parts to be fused are in contact with each other and are pressed against each other. The fibers are then heated at the parts to be fused in a manner such that the cladding glass softens, the spacing between the fiber cores is reduced, and the two fibers are fused together without softening the fiber cores. The fibers thus fused together are fixed to form a coupling element by cooling to room temperature.

Coupling elements thus manufactured are used in fiber-optical data transmission systems with one or more loops which are provided at different areas with such coupling elements to add or to split off a signal.

Normally, the fiber cladding of optical fibers is made of a cladding glass having a higher softening temperature than that of the core glass. This is because in the combinations of glasses most frequently used for the fiber cladding and the fiber core, the lower refractive index of the cladding glass goes hand in hand with a higher softening temperature, and the higher refractive index of the core glass corresponds to a lower softening temperature.

When two of these standard fibers are now fused together along their peripheries, the fiber cores are softened and deformed. This results in an uncontrolled escape of light from one fiber core, which light is not collected by the other fiber core. The expression deformed is to be understood herein to mean an undesirable deformation of the original cross-section of the fiber core or an uncontrolled change of the form of the fiber core which is causes excessively large optical losses.

Deformation of the fiber core is avoided in a method known from U.S. Pat. No. 3,902,786 (Brown). According to Brown, the claddings of the fibers are removed at their parts to be coupled. The fibers are then positioned so that their bare cores contact each other. The bare cores are then coated with a material whose refractive index is equal to that of the cladding material.

The method of Brown is rather objectionable because bare fiber cores, especially of monomode fibers, the cores of which each have a diameter on the order of 5 to 9 $\mu$m, cannot be handled practically.

Deformation of the fiber cores is also avoided in another method known from U.S. Pat. No. 4,054,366 (Barnoski et al). Deformation is avoided by heating the fiber claddings locally, at the area at which the fibers are to be fused, by means of a laser beam. This method is particularly intended for fusing together fibers having cores whose diameters are on the order of 30 to 100 $\mu$m and whose softening temperatures are lower than that of the cladding glasses.

In the method described in the first paragraph and known from British Patent Application No. 2,030,318, softening of the fiber cores is prevented by the use of fibers whose cladding glass has not only a lower refractive index but also a lower softening temperature than the core glass. However, no further data about the softening temperature and the viscosity of core glass and cladding glass are stated in this patent application.

SUMMARY OF THE INVENTION

It is an object of the invention to provide an improved method of fusing monomode fibers to form a coupling element.

According to the invention, the cores of the fibers used in the coupler have American softening temperatures which are at least 80° C. higher than the American softening temperatures of the claddings. Moreover, the coupler is produced by heating the fibers to a temperature, between 520° and 560° C., at which the cladding glass has a viscosity between $10^{9.6}$ and $10^{7.7}$ poises, whereas the core glass has a viscosity between $10^{11.5}$ and $10^{9.7}$ poises.

According to the prior art, it is difficult to manufacture fiber-optical coupling elements comprising two or more monomode fibers. Experiments have shown, however, that with the use of the characteristic measures according to the present invention, fiber-optical coupling elements can be obtained in a reproducible manner and without deformation of the fiber core. Monomode fibers with the aforementioned parameters can be manufactured in a continuous process, for example, according to the double crucible method.

It should be noted that the American softening temperature is defined as a temperature at which the glass has a viscosity of $10^{7.6}$ poises.

A fiber optical coupling element obtained by the method according to the invention has a fused joint with a regular appearance and has nondeformed fiber cores.

BRIEF DESCRIPTION OF THE DRAWINGS

FIG. 1 is a side elevational view of two fibers to be coupled, before fusion.

FIG. 2 is a cross-sectional view taken on line II—II of FIG. 1.

FIG. 3 is a side elevational view of the two fibers fused together.

FIG. 4 is a cross-sectional view taken on line IV—IV in FIG. 3.

FIG. 5 is a perspective view of two fibers in in a crossed position before fusion.

FIG. 6 is a perspective view of the two fibers of FIG. 5 after fusion.

DESCRIPTION OF THE PREFERRED EMBODIMENTS

Referring to FIG. 1, in the manufacture of a fiber-optical coupling element, two monomode fibers 3 are positioned so that their peripheries contact each other. Each fiber comprises a fiber core 7 and a fiber cladding 9. According to the embodiment of the invention shown in FIGS. 1 and 2, the fibers are positioned so that they contact each other and so that their axes c lie in one plane.

As is generally required for optical fibers, the cladding glass of the fiber claddings 9 has a lower refractive index than the core glass of the fiber cores 7. However, the American softening temperature of the core glass is at least 80° C. higher than the American softening temperature of the cladding glass.

The two fibers 3 are now heated at the part to be fused to a temperature at which the cladding glass softens but at which the core glass is still hard. The fibres are pressed against each other at the same time, so that the cladding glass is displaced and the two fiber claddings are fused together at the heated part. The spacing between the two fiber cores is reduced to a distance "A" between their axes on the order of a few microns. The fiber cores are practically brought into contact with each other. By cooling the fibers to room temperature, the coupling element thus obtained is fixed in the fused and coupled state.

FIGS. 3 and 4 show the fiber-optical coupling element 1 thus obtained with the fused fiber claddings 9 and the fiber cores 7. The original circular cross-sections of the cores are not deformed.

In order to ensure that the fibers are fused in a controlled and reproducible manner, the fusion process is distinctly limited to a given part of the fibers to be coupled, and the fibers are fused together over only a finite length. In the embodiment shown in FIGS. 1 to 4, the fibers are slightly curved for this purpose, i.e. with a radius of curvature R.

FIG. 5 and 6 show two fibers 3 before and after their fusion, respectively. The parts of the fibers to be fused are limited by positioning the fibers with respect to each other so that their axes enclose an angle $\alpha$. As a result, the fibers are fused together over a finite length.

In the method according to the invention, fiber-optical coupling elements were manufactured from monomode fibers having the following dimensions, parameters and compositions in mol.%.

|  | core glass | cladding glass |
|---|---|---|
| $SiO_2$ | 65.9 | 27.5 |
| MgO | 12.5 | 12.5 |
| $Na_2O$ | 8.0 | 8.0 |
| $K_2O$ | 8.0 | 8.0 |
| $Li_2O$ | 4.0 | 4.0 |
| $Nb_2O_5$ | 1.6 | — |
| $B_2O_3$ | — | 40.0 |
| n | 1.5336 | 1.528 |
| $T_A$ (°C.) | 658 | 563 |
| N at 520° C. (poises) | $10^{11.5}$ | $10^{9.6}$ |
| N at 560° C. (poises) | $10^{9.7}$ | $10^{7.7}$ |

$T_A$ is the American softening temperature,
n is the refractive index, and
N is the viscosity of the glass in poises.

The diameter D of the fiber cladding was 100 $\mu$m, and
the diameter d of the fiber core was 5.5 $\mu$m.

By small variations of the $Nb_2O_5$ content of the core glass, refractive index differences can be achieved within given tolerances.

The degree or extent of coupling between the two fibers can be expressed by the coupling coefficient, K. In the embodiment shown in FIGS. 3 and 4, the coupling coefficient K depends, inter alia, upon the radius of curvature R and upon the distance A between the axes of the fiber cores. In the manufacture of such coupling elements comprising two identical fibers of the type described above, with a radius of curvature, R, of 0.93 m, the coupling coefficient K could be brought to a desired value between 0.0 and 0.9 by a suitable choice of the distance A between 2.0 and 3.5 $\mu$m.

In the embodiment of the invention shown in FIG. 6, the coupling coefficient, K, depends, inter alia, upon the angle $\alpha$ and upon the distance A. In the manufacture of such coupling elements comprising two identical fibers of the of the type described above, the angle $\alpha$ having a value of 0.22°, the coupling coefficient could be varied between the values 0.0 and 0.9 also by varying the distance A between 2.0 and 3.5 $\mu$m.

The invention has been described with reference to embodiments comprising two monomode fibers of the same composition and having the same dimensions. By the method according to the invention, it is also possible to make coupling elements comprising more than two fibers having, as the case may be, the same dimensions.

What is claimed is:

1. A method of manufacturing a fiber-optical coupling element, said method comprising the steps of:
    providing at least two monomode fibers, each monomode fiber comprising a glass core and a glass cladding surrounding the core, the glass cladding have a softening temperature which is lower than the softening temperature of the glass core;
    positioning the two fibers so that their claddings are partially in contact with each other;
    heating the fibers where they contact each other to soften the glass claddings thereof, but not the cores;
    pressing the fibers toward each other to reduce the distance between the cores of the portions of the fibers which contact each, and to fuse the two fibers together; and
    cooling the fibers to room temperature to fix the fusion;
    characterized in that:
    the glass core of each fiber has an American softening temperature at least 80° C. higher than the American softening temperature of the glass cladding of the fiber;
    the fibers are heated to a temperature between 520° and 560° C.;
    at the heating temperature, each glass core has a viscosity between $10^{11.5}$ and $10^{9.7}$ poises; and
    at the heating temperature each glass cladding has a viscosity between $10^{9.6}$ and $10^{7.7}$ poises.

2. A method as claimed in claim 1, characterized in that:
    the fiber claddings are in contact at one area only; and
    the fibers are pressed toward each other to adjust the distance between the fiber cores and to adjust the angle between the fiber cores to achieve a selected coupling coefficient.

* * * * *